United States Patent
Yamamoto et al.

(10) Patent No.: US 6,782,201 B2
(45) Date of Patent: Aug. 24, 2004

(54) FOUR FIBER RING NETWORK OPTICAL SWITCHING CIRCUIT USING BRANCHED INPUTS

(75) Inventors: Shu Yamamoto, Shiki (JP); Tetsuya Miyazaki, Tokyo (JP); Yasuyuki Nagao, Hasuda (JP); Tomohiro Otani, Omiya (JP)

(73) Assignees: DDI Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 436 days.

(21) Appl. No.: 09/731,587

(22) Filed: Dec. 7, 2000

(65) Prior Publication Data

US 2002/0075535 A1 Jun. 20, 2002

(30) Foreign Application Priority Data

Dec. 8, 1999 (JP) .......................................... P11-349489

(51) Int. Cl.[7] .................... H04B 10/08; H04B 17/00; H04J 14/00
(52) U.S. Cl. ................................ 398/59; 398/3; 398/4; 398/12; 398/19; 398/45; 398/46; 398/56; 398/57; 398/59; 398/72; 398/107; 398/111
(58) Field of Search .......................... 398/59, 3, 4, 56, 398/57, 12, 19, 45, 46, 72, 107, 111

(56) References Cited

U.S. PATENT DOCUMENTS

| | | | | |
|---|---|---|---|---|
| 4,630,883 A | * | 12/1986 | Taylor et al. .................. | 385/47 |
| 5,255,332 A | * | 10/1993 | Welch et al. .................. | 385/17 |
| 5,751,868 A | * | 5/1998 | Bala et al. ..................... | 385/16 |
| 5,903,687 A | * | 5/1999 | Young et al. .................. | 385/17 |
| 5,960,132 A | * | 9/1999 | Lin .............................. | 385/18 |
| 5,982,554 A | * | 11/1999 | Goldstein et al. ............ | 359/629 |
| 5,986,783 A | * | 11/1999 | Sharma et al. ................ | 398/59 |
| 6,023,359 A | * | 2/2000 | Asahi ............................ | 398/5 |
| 6,160,928 A | * | 12/2000 | Schroeder ..................... | 385/18 |
| 6,195,186 B1 | * | 2/2001 | Asahi ............................ | 398/5 |
| 6,208,777 B1 | * | 3/2001 | Jing ............................. | 385/16 |
| 6,215,222 B1 | * | 4/2001 | Hoen ........................... | 310/309 |
| 6,222,653 B1 | * | 4/2001 | Asahi ............................ | 398/4 |
| 6,414,771 B2 | * | 7/2002 | Al-Salameh et al. .......... | 398/48 |
| 6,445,841 B1 | * | 9/2002 | Gloeckner et al. ............ | 385/17 |
| 6,570,685 B1 | * | 5/2003 | Fujita et al. .................. | 398/79 |
| 2001/0040711 A1 | * | 11/2001 | Al-Salameh et al. ........ | 359/128 |

OTHER PUBLICATIONS

"High Extinction Ratio and Low–Loss Silica–Based 8×8 Sctrictly Nonblocking Thermooptic Matrix Switch," Takashi Goh, Akira Himeno, Masayuki Okuno, Hiroshi Takahashi, Kuninori Hattori, Journal of Lightwave Technology, vol. 17, No. 7, Jul. 1999.*

"DC–20 GHz NxM Passive Switch," Manfred J. Schindler, Mary Ellen Miller, IEEE Transactions on Microwave Theory and Techniques, vol. 36, No. 12, Dec. 1988.*

(List continued on next page.)

*Primary Examiner*—Jason Chan
*Assistant Examiner*—Alex Chan
(74) *Attorney, Agent, or Firm*—Olson & Hierl, Ltd.

(57) ABSTRACT

A four fiber ring network optical switching circuit capable of realizing the bridge function at times of the span switching and the ring switching economically by a very compact structure is disclosed. A four fiber ring network optical switching circuit is formed by a 10×8 optical matrix switch having ten input ports and eight output ports, and two branching elements adapted to branch each one of two optical signals among eight optical signals that are inputs of the four fiber ring network optical switching circuit, into two identical optical signals, and to enter the two identical optical signals into two input ports of the 10×8 optical matrix switch such that the eight optical signals are entered into the ten input ports of the 10×8 optical matrix switch as ten optical signals.

7 Claims, 8 Drawing Sheets

OTHER PUBLICATIONS

"A 1×8 InP/InGaAsP Optical Matrix Switch with Low Insertion Loss and High Crosstalk Suppression," Meinrad Schien;e, Gundolf Wenger, Sepp Eichinger, Jurgen Muller, Lothar Stoll, and Gustav Muller, Journal of Lightwave Technology, No. 14, No. 5, May 1996.*

"4×4 Optical–Gate Matrix Switch," Akira Himeno and Morio Kobayashi, Journal of Lightwave Technology, vol. LT–3, No. 2, Apr. 1985.*

High–Density Connection–symmetric Free–space Micromachined Polygon Optical Crossconnections with Low Loss from WDM Networks, by L. Y. Lin, E. L. Goldstein, J. M. Simmons, and R. W. Tkach (AT&T Labs–Research), Optical Fiber Communication Conference (San Jose Conference Center) San Jose, California, Feb., 1998, pp. PD24–1 to PD24–4.

* cited by examiner

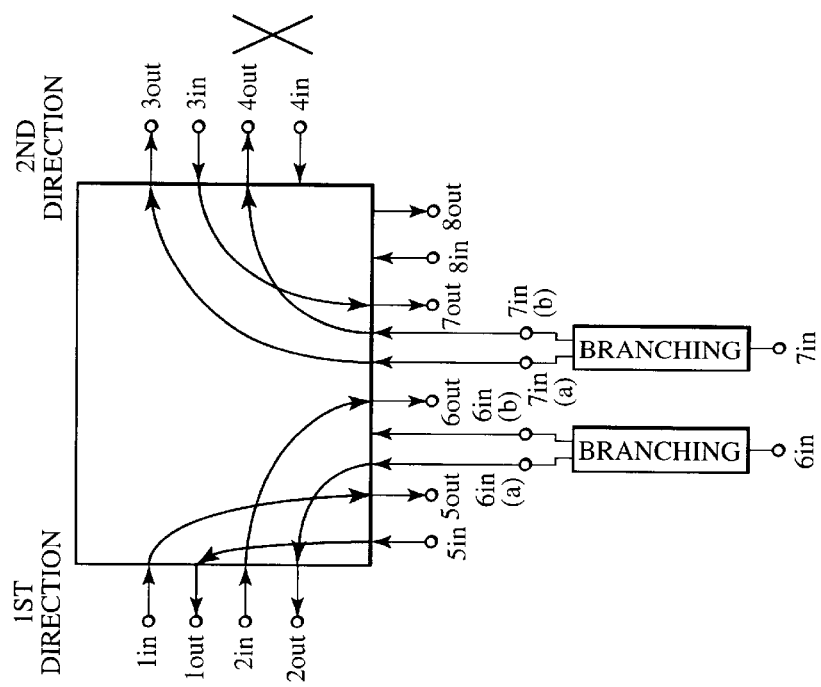
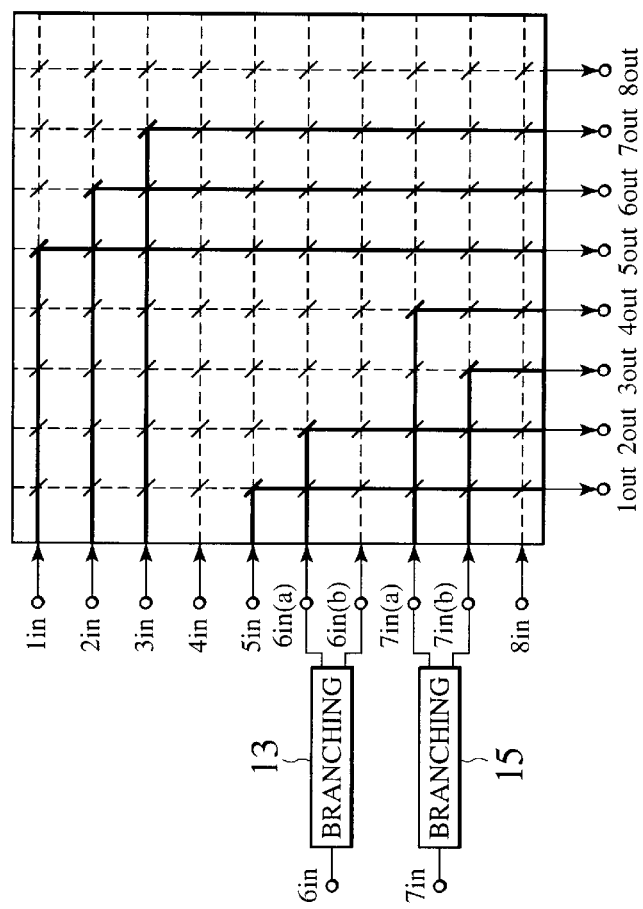

ized by the four fiber ring network optical switching circuit as shown in FIG. 5. This ring network optical switching circuit has first and second optical input/output ports (1) and (2) to which the protection and working fiber pairs in the first direction are connected, third and fourth optical input/output ports (3) and (4) to which the protection and working fiber pairs in the second direction are connected, fifth and sixth optical input/output ports (5) and (6) to be used as protection and working add/drop ports for transmission from the second direction to the first direction, and seventh and eighth optical input/output ports (7) and (8) to be used as working and protection add/drop ports for transmission from the first direction to the second direction.

FOUR FIBER RING NETWORK OPTICAL SWITCHING CIRCUIT USING BRANCHED INPUTS

BACKGROUND OF THE INVENTION

1. Field of the Invention

The present invention relates to a four fiber ring network optical switching circuit to be used at each node of an optical ring network system for carrying out a working/protection switching at optical level in a bidirectional optical ring network formed by four fibers, for example, and more specifically, to a four fiber ring network optical switching circuit for realizing a span switch function and a ring switch function by cross-connecting first and second working and protection input and output ports and first and second working and protection add/drop input and output ports for inputting and outputting working and protection signals transmitted through a ring network.

2. Description of the Background Art

As shown in FIGS. 4A and 4B, the four fiber ring optical network is formed by connecting a plurality of nodes A, B, C, D, E and F by a ring shaped transmission path comprising four optical fibers including a working fiber pair indicated by bold and thin solid lines and a protection fiber pair indicated by dashed lines. Here each node is referred to as a four fiber ring node. Also, one of the two fibers constituting each fiber pair will be used for an upward transmission while the other one will be used for a downward transmission.

In the four fiber ring optical network of this configuration, under the normal state, signals will be transmitted between arbitrary nodes through a route using the working fiber pair indicated by a bold solid line as a normal route in FIGS. 4A and 4B. In the example shown in FIGS. 4A and 4B, signals will be transmitted between nodes F and C by the normal route using the working fiber pair via nodes A and B.

When signals are transmitted between nodes F and C via nodes A and B by the normal route using the working fiber pair transmission path in this manner, if a trouble such as a span fault occurs in the working fiber pair transmission path of the normal route between nodes B and C as shown in FIG. 4A, for example, the span switching from the working fiber pair transmission path to a protection fiber pair transmission path is carried out by span switches at nodes B and C such that a transmission path connecting between nodes B and C is switched to the protection fiber pair transmission path indicated by a dashed line. As a result, the signal transmission between nodes F and C will be carried out by using the working fiber pair transmission path of the normal route between nodes A and F and between nodes A and B, and the protection fiber pair transmission path between nodes B and C.

Also, similarly, when signals are transmitted between nodes F and C via nodes A and B by the normal route using the working fiber pair transmission path, if a trouble such as a cable disconnection occurs in a fiber cable between nodes B and C such that both the working and protection fiber pair transmission paths are disconnected as shown in FIG. 4B, for example, the ring switching from the working fiber pair transmission path to the protection fiber pair transmission path is carried out by ring switches at nodes F, E, D and C such that the signal transmission between nodes F and C will be carried out by switching a transmission path to a bypass route via nodes E and D which is indicated by a bold solid line and using the protection fiber pair transmission path, so as to rescue the working signals.

A switch of the node for carrying out the span switching and the ring switching as described above is realized by the four fiber ring network optical switching circuit as shown in FIG. 5. This ring network optical switching circuit has first and second optical input/output ports (1) and (2) to which the protection and working fiber pairs in the first direction are connected, third and fourth optical input/output ports (3) and (4) to which the protection and working fiber pairs in the second direction are connected, fifth and sixth optical input/output ports (5) and (6) to be used as protection and working add/drop ports for transmission from the second direction to the first direction, and seventh and eighth optical input/output ports (7) and (8) to be used as working and protection add/drop ports for transmission from the first direction to the second direction.

In the ring network optical switching circuit of FIG. 5, the first optical input/output port (1) is directly connected with the fifth optical input/output port (5) and can be also connected with the sixth optical input/output port (6) via a span switch and with the seventh optical input/output port (7) via a ring switch. Also, the second optical input/output port (2) is directly connected with the sixth optical input/output port (6) and can be also connected with the first optical input/output port (1) via a span switch and with the third optical input/output port (3) and the eighth optical input/output port (8) via a ring switch. Also, the third optical input/output port (3) is directly connected with the eighth optical input/output port (8) and can be also connected with the seventh optical input/output port (7) via a span switch and with the sixth optical input/output port (6) via a ring switch. Also, the fourth optical input/output port (4) is directly connected with the seventh optical input/output port (7) and can be also connected with the third optical input/output port (3) via a span switch and with the first optical input/output port (1) and the fifth optical input/output port (5) via a ring switch.

Conventionally, the ring network optical switching circuit as shown in FIG. 5 is formed by using twelve 2×2 optical switches as shown in FIG. 6.

In FIG. 6, SW-1, 3, 6 and 8 are ring switching 2×2 optical switches, SW-2, 4, 5 and 7 are pass through 2×2 optical switches, and SW-9, 10, 11 and 12 are span switching 2×2 optical switches. Also, CP-1 is an optical coupler (optical branching element) for bridging with respect to a span switching to the first direction, CP-2 is an optical coupler (optical branching element) for bridging with respect to a span switching to the second direction, CP-3 is an optical coupler for bridging to the working fiber in the second direction with respect to a ring switching to the first direction, and CP-4 is an optical coupler for bridging to the working fiber in the first direction with respect to a ring switching to the second direction.

When the working signals are switched to the protection fiber pair transmission path by the span switching and the ring switching at a time of the trouble occurrence as in the cases shown in FIGS. 4A and 4B by using the ring network optical switching circuit as shown in FIG. 5 and FIG. 6, in order to automatically switching the working signals back to the working fiber pair at a time of the subsequent recovery from the trouble, there is a need for the so called bridge function for starting the transmission by switching the working signals into the protection fiber pair transmission path while continuing to transmit signals also to the working fiber pair transmission path on which the trouble has occurred, so that the conventional ring network optical switching circuit shown in FIG. 6 is equipped with a bridge function at times of the span switching and the ring switching as described above.

The conventional four fiber ring network optical switching circuit described above can be formed by a relatively small number of twelve 2×2 optical switches, but if the optical switch is individually implemented, the optical switch itself becomes large and an entire structure of the ring network optical switching circuit also becomes large due to arrangements of optical fibers to be connected to the optical switches, and in conjunction with that there has been a problem that a cost required for the wiring processing becomes high.

SUMMARY OF THE INVENTION

It is therefore an object of the present invention to provide a four fiber ring network optical switching circuit capable of realizing the bridge function at times of the span switching and the ring switching economically by a very compact structure.

According to one aspect of the present invention there is provided a four fiber ring network optical switching circuit, comprising: a 10×8 optical matrix switch having ten input ports and eight output ports; and two branching elements adapted to branch each one of two optical signals among eight optical signals that are inputs of the four fiber ring network optical switching circuit, into two identical optical signals, and to enter the two identical optical signals into two input ports of the 10×8 optical matrix switch such that the eight optical signals are entered into the ten input ports of the 10×8 optical matrix switch as ten optical signals.

According to another aspect of the present invention there is provided a four fiber ring network optical switching circuit to be used at nodes for connecting optical fiber transmission paths in a ring shape so as to form a bidirectional optical ring network, the four fiber ring network optical switching circuit comprising: first and second working and protection input and output ports and first and second working and protection add/drop input and output ports adapted to input and output working and protection signals to be transmitted through the bidirectional optical ring network; first and second branching elements adapted to branch each one of optical input signals for the first and second working add/drop input ports, and having first and second working branch-1 and branch-2 add/drop input ports for outputting branched optical signals; and an optical matrix switch adapted to cross-connect a plurality of input ports including the first and second working and protection input ports, the first and second protection add/drop input ports and the first and second branch-1 and branch-2 working add/drop input ports, and a plurality of output ports including the first and second working and protection output ports and the first and second working and protection add/drop output ports, so as to realize a span switching function and a ring switching function.

Other features and advantages of the present invention will become apparent from the following description taken in conjunction with the accompanying drawings.

BRIEF DESCRIPTION OF THE DRAWINGS

FIGS. 2A and 2B are diagrams for explaining the span switching function and the bridge function of the ring network optical switching circuit of FIG. 1.

DETAILED DESCRIPTION OF THE PREFERRED EMBODIMENTS

Referring now to FIG. 1A to FIG. 8, the preferred embodiments of the four fiber ring network optical switching circuit according to the present invention will be described in detail.

Figure 1B:
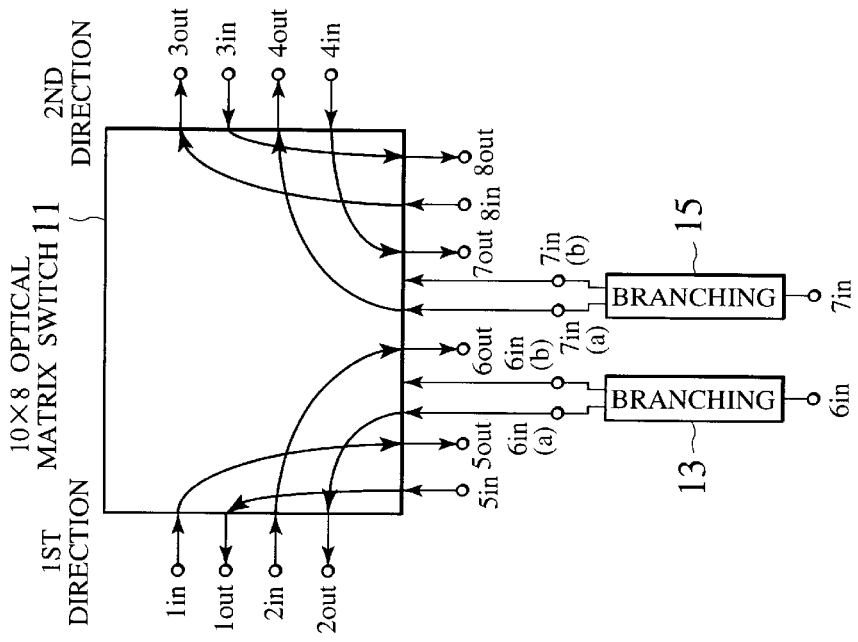
FIGS. 1A and 1B are diagrams showing an exemplary configuration of a four fiber ring network optical switching circuit according to one embodiment of the present invention.
Figure 1A:
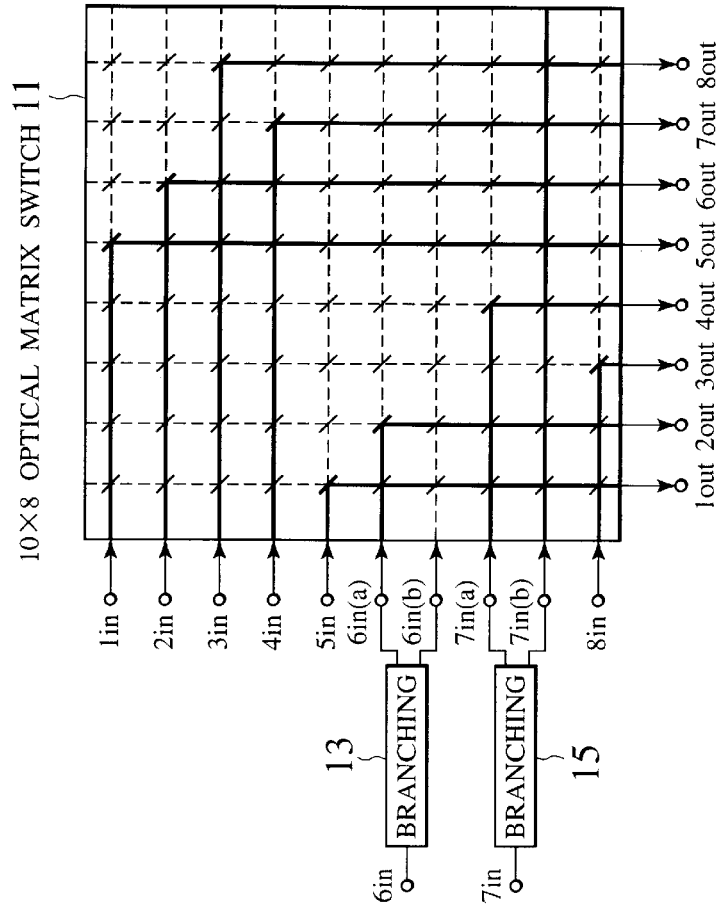

FIG. 1A shows an exemplary configuration of the ring network optical switching circuit according to one embodiment of the present invention. The ring network optical switching circuit shown in FIG. 1A has a 10×8 optical matrix switch 11 and two branching elements 13 and 15.

The 10×8 optical matrix switch 11 has ten input ports and eight output ports, and eighty mirrors are provided at intersections of the input ports and the output ports, at 45° angle, for example, as indicated by short oblique lines. Each mirror provided at each intersection is turned down so as not to reflect optical signals under a normal state of not being controlled by a control unit (not shown), and when a desired mirror is turned up by the control unit, the optical signals from the input port corresponding to the intersection of that mirror will be reflected by 90° at that mirror and transmitted to the output port corresponding to that intersection, such that the switching between the input port and the output port corresponding to that intersection is realized.

The 10×8 optical matrix switch 11 in this configuration can be formed economically in a very compact size, such as within 1 cm square, for example. In fact, the 10×8 optical matrix switch 11 can be formed in a structure in which small mirrors are arranged at intersections of input and output beams at 45° angle by utilizing the micro-machine technology using polycrystalline silicon, and moving these mirrors in a vertical direction electrically by utilizing the electrostatic force. As a result, a micro optical matrix switch with integrated mirrors can be realized easily (see: L. Y. Lin, E. L. Goldstein, J. M. Simmons, and R. W. Tkatch, "High-Density Connection-Symmetric Free-Space Micromachined Polygon Optical Crossconnects with Low Loss for WDM Networks", OFC '98, PD24-1, February 1998, for example).

Also, the branching elements 13 and 15 can be formed by fiber couplers or beam splitters using semipermeable membranes, for example.

The 10×8 optical matrix switch 11 has input ports including a first protection input port 1$in$, a first working input port 2$in$, a second protection input port 3$in$, a second working input port 4$in$, a first protection add/drop input port 5$in$, a first working add/drop branch-1 input port 6$in(a)$, a first working add/drop branch-2 input port 6$in(b)$, a second working add/drop branch-1 input port 7$in(a)$, a second working add/drop branch-2 input port 7$in(b)$, and a second protection add/drop input port 8$in$, and output ports including a first protection output port 1*out*, a first working output port 2*out*, a second protection output port 3*out*, a second working output port 4*out*, a first protection add/drop output port 5*out*, a first working add/drop output port 6*out*, a second working add/drop output port 7*out* and a second protection add/drop output port 8*out*.

The first working add/drop branch-1 input port 6*in*(*a*) and the first working add/drop branch-2 input port 6*in*(*b*) of the 10×8 optical matrix switch 11 are connected to outputs of a branching element 13, and connected to a first working add/drop input port 6*in* through this branching element 13. Similarly, the second working add/drop branch-1 input port 7*in*(*a*) and the second working add/drop branch-2 input port 7*in*(*b*) of the 10×8 optical matrix switch 11 are connected to outputs of a branching element 15, and connected to a second working add/drop input port 7*in* through this branching element 15.

In this way, the 10×8 optical matrix switch 11 is adapted to cross-connect a plurality of input ports including the first and second working and protection input ports 1*in*, 2*in*, 3*in* and 4*in*, the first and second protection add/drop input ports 5*in* and 8*in*, and the first and second working add/drop branch-1 and branch-2 input ports 6*in*(*a*), 6*in*(*b*), 7*in*(*a*) and 7*in*(*b*), and a plurality of output ports including the first and second working and protection output ports 1*out*, 2*out*, 3*out* and 4*out*, and the first and second working and protection add/drop output ports 5*out*, 6*out*, 7*out* and 8*out*, so as to realize a span switching function and a ring switching function.

Figure 4A:
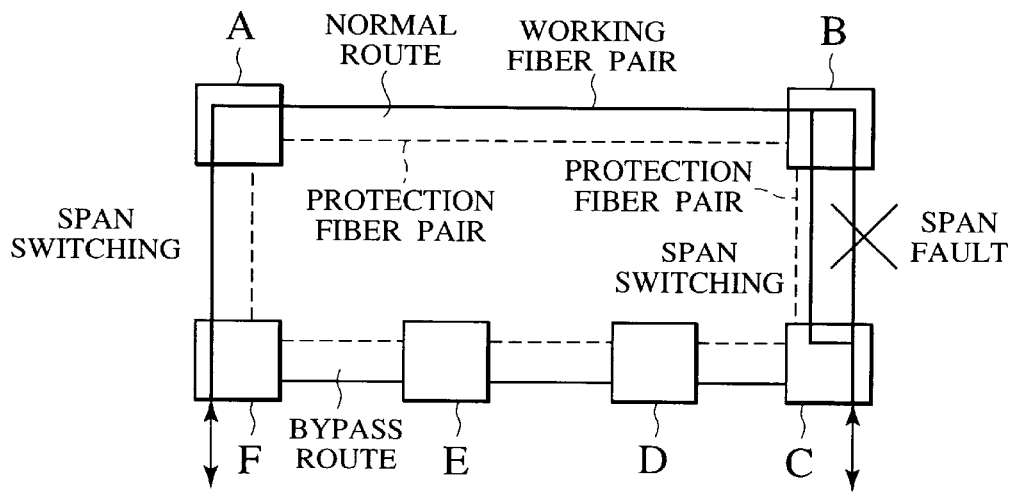
FIGS. 4A and 4B are diagrams for explaining the route switching at a time of trouble occurrence in the four fiber ring optical network, for two types of troubles.
Figure 4B:
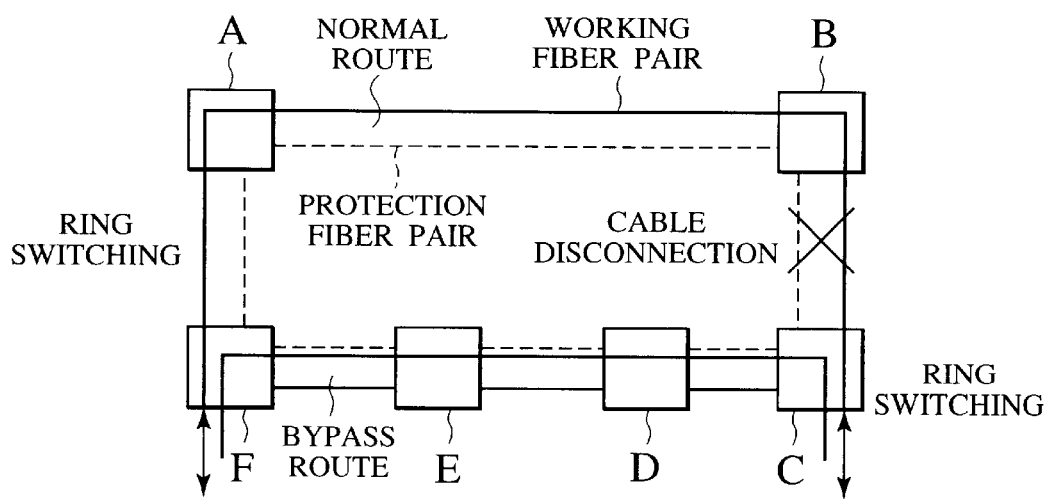
Figure 5:
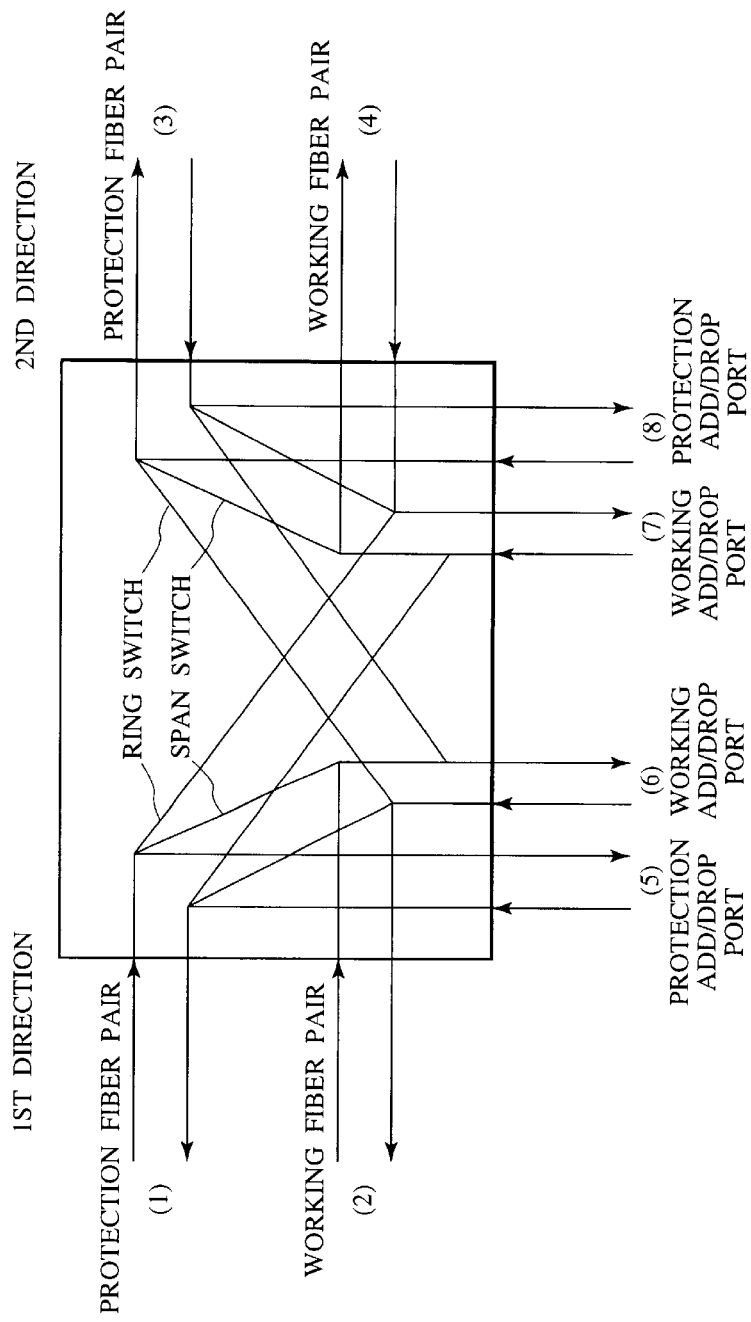
FIG. 5 is a diagram showing a four fiber ring network optical switching circuit used at a node of the four fiber ring optical network of FIG. 4.
Figure 6:
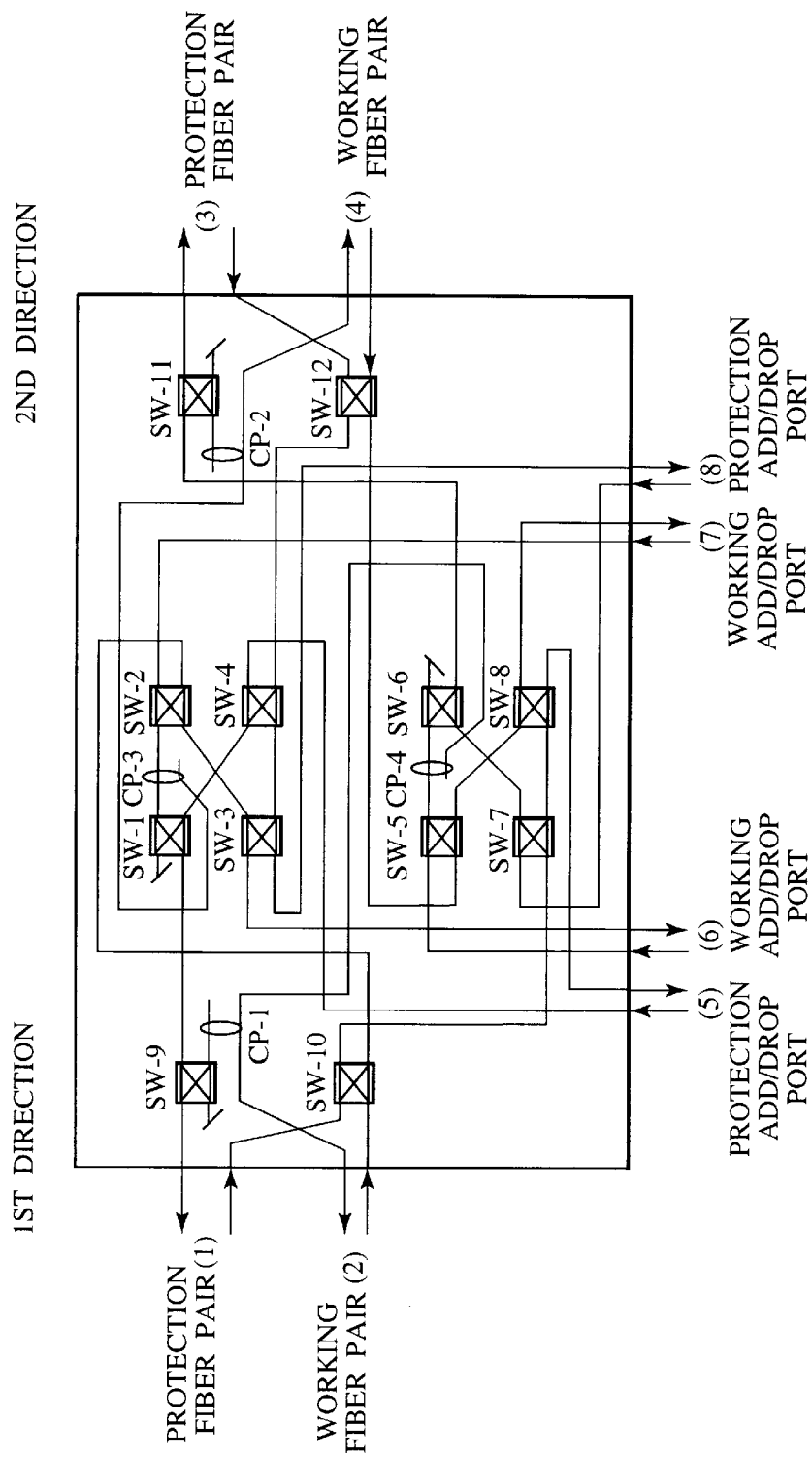
FIG. 6 is a diagram showing a configuration of a conventional ring network optical switching circuit.

In the case where the ring network optical switching circuit of FIG. 1A is used as the four fiber ring network optical switching circuit at a node in the four fiber ring optical network shown in FIGS. 4A and 4B, the input and output ports of the ring network optical switching circuit, i.e., the input ports and the output ports of the 10×8 optical matrix switch 11 and the input ports 6*in* and 7*in* as inputs of the branching elements 13 and 15, will be connected to the optical fiber transmission paths constituting the four fiber ring optical network similarly as in the case shown in FIG. 5 and FIG. 6, and the connections with respect to the optical fiber transmission paths can be re-expressed as shown in FIG. 1B similarly as in the case shown in FIG. 5 and FIG. 6.

Namely, in the first direction of the 10×8 optical matrix switch 11, the first protection input port 1*in* and the first protection output port 1out are connected to the protection fiber pair transmission path as in the case shown in FIG. 5 and FIG. 6, the first working input port 2*in* and the first working output port 2*out* are connected to the working fiber pair transmission path. Also, in the second direction of the 10×8 optical matrix switch 11, the second protection output port 3*out* and the second protection input port 3*in* are connected to the protection fiber pair transmission path, and the second working output port 4*out* and the second working input port 4*in* are connected to the working fiber pair transmission path.

Also, in the add/drop from the second direction to the first direction of the 10×8 optical matrix switch 11, the first protection add/drop input port 5*in* and the first protection add/drop output port 5*out* are connected to the protection fiber pair transmission path, and the first working add/drop input port 6*in* connected with the first working add/drop branch-1 input port 6*in*(*a*) and the first working add/drop branch-2 input port 6*in*(*b*) through the branching element 13 and the first working add/drop output port 6*out* are connected to the working fiber pair transmission path. Also, in the add/drop from the first direction to the second direction of the 10×8 optical matrix switch 11, the second working add/drop input port 7*in* connected with the second working add/drop branch-1 input port 7*in*(*a*) and the second working add/drop branch-2 input port 7*in*(*b*) through the branching element 15 and the second working add/drop output port 7*out* are connected to the working fiber pair transmission path, and the second protection add/drop input port 8*in* and the second protection add/drop output port 8*out* are connected to the protection fiber pair transmission path.

In the ring network optical switching circuit in the above configuration, under the normal state, only those mirrors indicated by bold short oblique lines in FIG. 1A are turned up among the plurality of mirrors such that signals between the input and output ports corresponding to these turned up mirrors will be switched as indicated by bold lines in FIG. 1A.

FIG. 1B shows the connections among the input and output ports under this normal state in an easily comprehensible way. Namely, in this normal state, the first protection add/drop input port 5*in* and the first protection add/drop output port 5*out* are connected to the first protection input port 1*in* and the first protection output port 1*out* respectively, and the first working add/drop branch-1/2 input ports 6*in* (*a*)/(*b*) and the first working add/drop output port 6*out* are connected with the first working input port 2*in* and the first working output port 2*out* respectively. Also, the second working add/drop branch-1/2 input ports 7*in*(*a*)/(*b*) and the second working add/drop output port 7*out* are connected with the second working output port 4*out* and the second working input port 4*in* respectively, and the second protection add/drop input port 8*in* and the second protection add/drop output port 8*out* are connected with the second protection output port 3*out* and the second protection input port 3*in* respectively. In this way, the working and protection add/drop signals are lead to the working and protection fiber pair transmission paths in the first and second directions.

In the case where the ring network optical switching circuit of this embodiment in the above configuration is used at a node of the four fiber ring optical network shown in FIGS. 4A and 4B, if the span fault occurs in the working fiber pair transmission path between nodes B and C as shown in FIG. 4A, for example, this corresponds to a fault in the working fiber pair transmission path connected to the second working output port 4*out* and the second working input port 4*in* of the ring network optical switching circuits constituting the nodes B and C, as indicated by "X" mark in FIG. 2B.

When such a trouble occurs, the ring network optical switching circuit re-connects the second working add/drop branch-1/2 input ports 7*in*(*a*)/(*b*) and the second working add/drop output port 7*out* that are connected through the 10×8 optical matrix switch 11 with the second working output port 4*out* and the second working input port 4*in* to which this troubling working fiber pair transmission path is connected, as follows.

Namely, as shown in FIGS. 2A and 2B, all the protection system connections including the connection between the second protection add/drop input port 8*in* and the second protection output port 3*out* and the connection between the second protection add/drop output port 8*out* and the second protection input port 3*in* are disconnected. Then, among the second working add/drop branch-1/2 input ports 7*in*(*a*)/(*b*), only the branched second working add/drop branch-2 input port 7*in*(*b*) is kept connected to the second working output port 4*out*, while the other second working add/drop branch-1 input port 7*in*(*a*) is connected by span switching to the second protection output port 3*out*, and the second working add/drop input port 7*in* is connected by bridge to the second protection output port 3*out* and the second working output port 4*out*. Then, the second working add/drop output port 7*out* is connected by span switching to the second protection input port 3*in* from the second working input port 4*in*.

In this way, it is possible to realize the span switching state similarly as in the conventional case. As a result, the nodes B and C between which the span fault has occurred will be connected by the protection fiber pair transmission line as indicated by a bold solid line in FIG. 4A, through the ring network optical switching circuit which is span switched in this way.

Figure 3B:
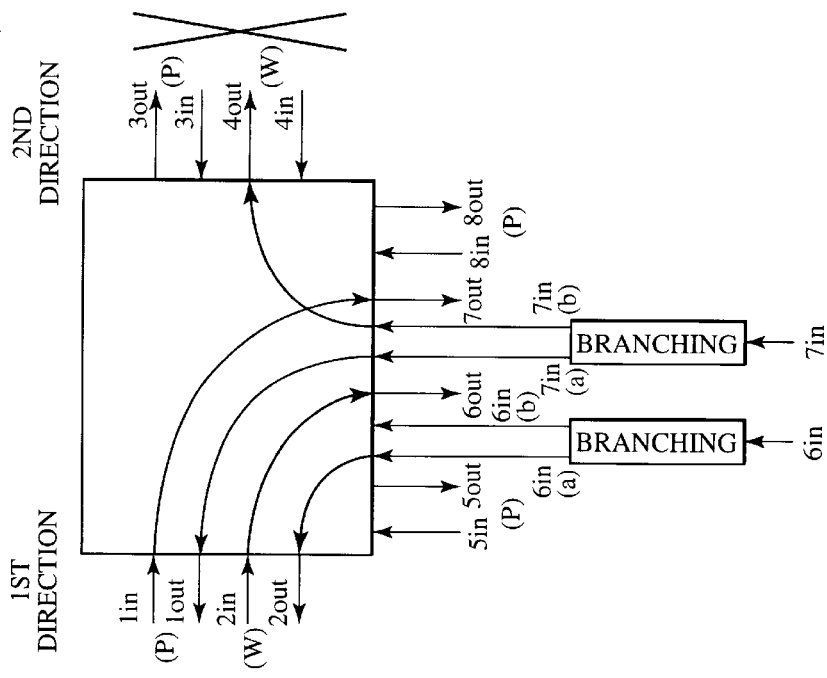
FIGS. 3A and 3B are diagrams for explaining the ring switching function and the bridge function of the ring network optical switching circuit of FIG. 1.

On the other hand, if the cable disconnection occurs at the fiber cable between nodes B and C as shown in FIG. 4B, for example, this corresponds to a disconnection of a cable in the the working fiber pair transmission path connected to the second protection output port 3*out*, the second protection input port 3*in*, the second working output port 4*out* and the second working input port 4*in* of the ring network optical switching circuits constituting the nodes B and C, as indicated by "X" mark in FIG. 3B.

When such a trouble occurs, the ring network optical switching circuit re-connects the the second protection add/drop input port 8*in*, the second protection add/drop output port 8*out*, the second working add/drop branch-1/2 input ports 7*in*(*a*)/(*b*) and the second working add/drop output port 7*out* that are connected through the 10×8 optical matrix switch 11 with the second protection output port 3*out*, the second protection input port 3*in*, the second working output port 4*out* and the second working input port 4*in* to which this troubling working fiber pair transmission path is connected, as follows.

Figure 3A:
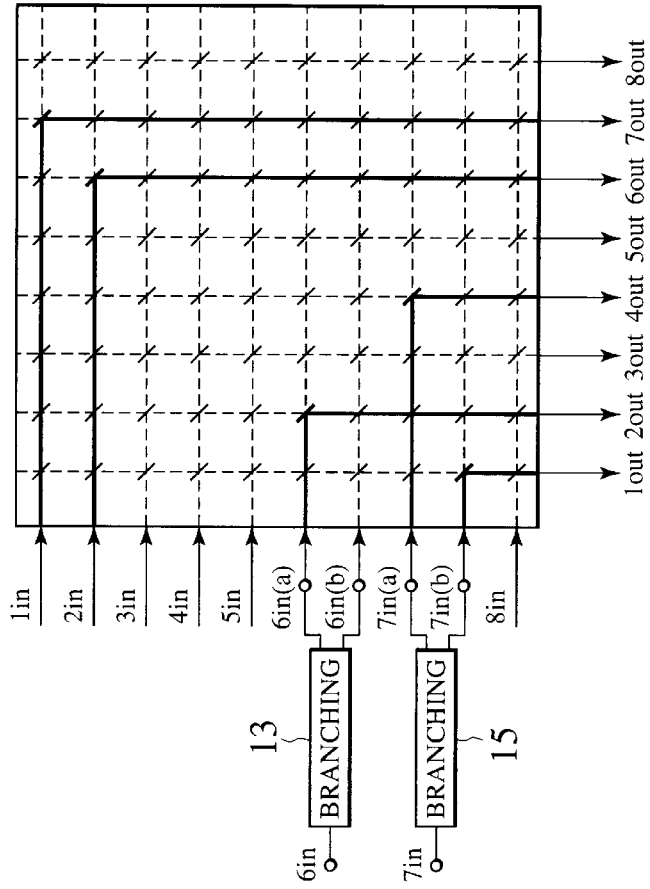

Namely, as shown in FIGS. 3A and 3B, among the second working add/drop branch-1/2 input ports 7*in*(*a*)/(*b*), only the branched second working add/drop branch-2 input port 7*in*(*b*) is kept connected to the second working output port 4*out*, while the other second working add/drop branch-1 input port 7*in*(*a*) is connected by ring switching to the first protection output port 1*out*, and the second working add/drop input port 7*in* is connected by bridge to the first protection output port 1*out* and the second working output port 4*out*. Then, the second working add/drop output port 7*out* is connected by ring switching to the first protection input port 1*in* from the second working input port 4*in*. Then, all the protection system connections including the connection between the second protection add/drop input port 8*in* and the second protection output port 3*out* and the connection between the second protection add/drop output port 8*out* and the second protection input port 3*in* are disconnected.

In this way, it is possible to realize the ring switching state similarly as in the conventional case. As a result, the nodes F, E, D and C will be connected by the bypass route as indicated by a bold solid line in FIG. 4B without passing through the nodes B and C between which the cable disconnection has occurred, through the ring network optical switching circuit which is ring switched in this way.

It is to be noted that the above embodiment is directed to the case of using a switch in the 10×8, i.e., (8+2)×8, matrix configuration as the optical matrix switch 11, but the present invention is not necessarily limited to this case and is equally applicable to the case of using the optical matrix switch in 10n×8n matrix configuration, where n is an integer.

Figure 7:
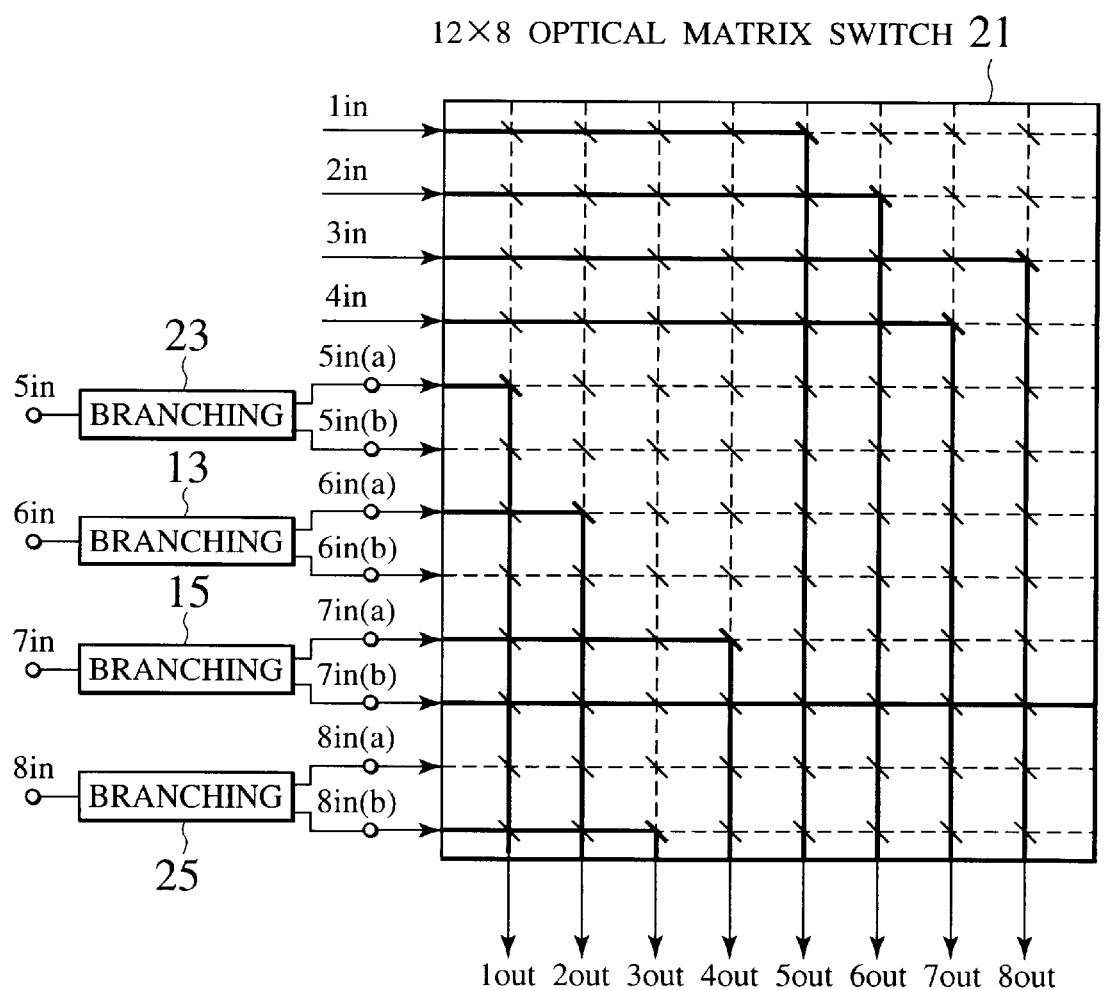
FIG. 7 is a diagram showing an exemplary configuration of a four fiber ring network optical switching circuit according to another embodiment of the present invention.

FIG. 7 shows an exemplary configuration of the four fiber ring network optical switching circuit according to another embodiment of the present invention.

This four fiber ring network optical switching circuit of FIG. 7 differs from that of FIG. 1A in that the 10×8 optical matrix switch 11 is replaced by a 12×8 optical matrix switch 21, and third and fourth branching elements 23 and 25 are additionally provided to branch the optical input signals of the first and second protection add/drop input ports 5*in* and 8*in* as the inputs of the 12×8 optical matrix switch 21. The rest of the configuration is the same as that of FIG. 1.

By forming the working ports and the protection ports symmetrically in this way, it becomes possible to reverse the functions of the working ring and the protection ring.

Figure 8:
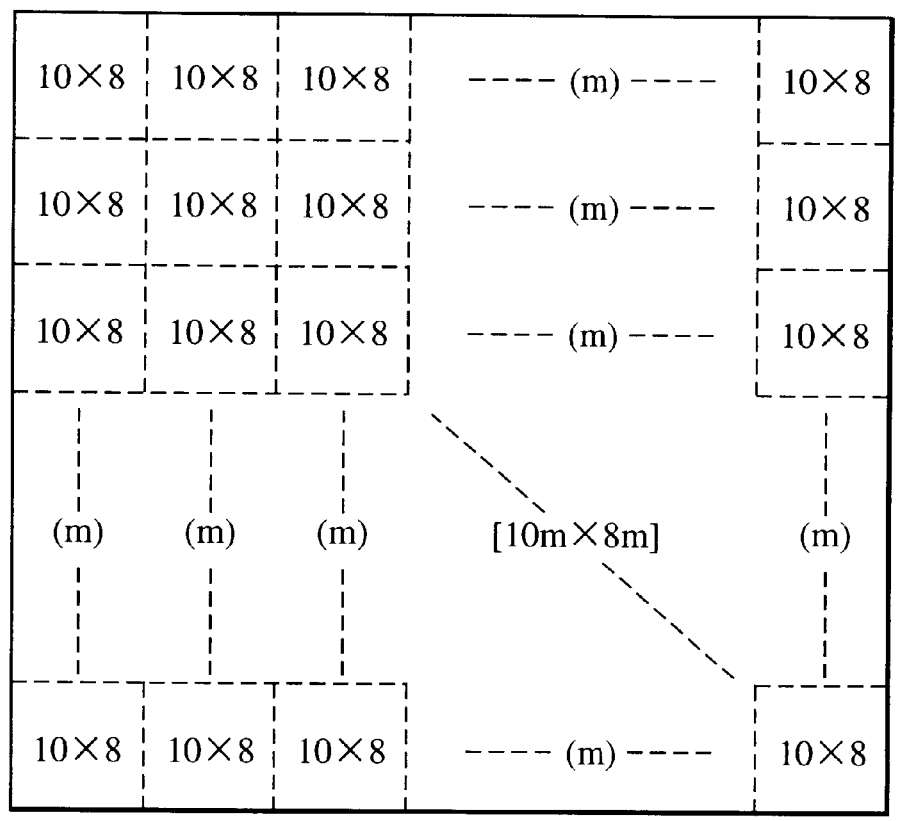
FIG. 8 is a diagram showing an exemplary configuration of a four fiber ring network optical switching circuit according to still another embodiment of the present invention.

FIG. 8 shows a 10m×8m optical matrix switch configuration, where m is an integer, that can be used in the four fiber ring network optical switching circuit according to still another embodiment of the present invention.

In this configuration of FIG. 8, one 10m×8m optical matrix switch carries out switching of m sets of four fiber rings, by being connected over rings including individual working and protection rings of m sets of the four fiber rings As described, according to the present invention, two optical signals among eight optical signals to be entered at the input ports are branched by branching elements and ten optical signals including the branched two optical signals are entered at the input ports of the 10×8 optical matrix switch, so that it is possible to realize the bridge function at times of the span switching and the ring switching without a failure by using the branched two optical signals, while using an economical optical matrix switch in a compact structure.

Also, according to the present invention, the optical input signals to be entered at the first and second working add/drop input ports are branched by respective branching elements, and these branched optical signals are entered at the branch-1 and branch-2 input ports of each of the first and second working add/drop input ports, so that it is possible to realize the bridge function at times of the span switching and the ring switching without a failure by using the branched optical input signals, while using an economical optical matrix switch in a compact structure.

Also, according to the present invention, the optical matrix switch is the 10×8 optical matrix switch having ten input ports and eight output ports, and the same input signals obtained by respective branching elements are entered at two input ports among the ten input ports, so that it is possible to realize the bridge function at times of the span switching and the ring switching without a failure.

Also, according to the present invention, plural sets of a combination of the 10×8 optical matrix switch and two branching elements can be provided such that plural four fiber rings can be switched by these plural sets of a combination of the 10×8 optical matrix switch and two branching elements.

Also, according to the present invention, the optical input signals to be entered at the first and second protection add/drop input ports can also be branched by third and fourth branching elements and entered into the 12×8 optical matrix switch in order to make the working ports and the protection ports symmetrical, so that the functions of the working ring and the protection ring can be reversed.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A four fiber ring network optical switching circuit, comprising:

a 10×8 optical matrix switch having ten input ports and eight output ports and eighty turnable mirrors provided at intersections of the input ports and the output ports; and two branching elements adapted to branch each one of two optical signals among eight optical signals that are inputs of the four fiber ring network optical switching circuit, into two identical optical signals, and to enter the two identical optical signals into two input ports of the 10×8 optical matrix switch such that the eight optical signals are entered into the ten input ports of the 10×8 optical matrix switch as ten optical signals.

2. The four fiber ring network optical switching circuit of claim 1, wherein a combination of the 10×8 optical matrix switch and the two branching elements is provided in plural sets, such that the plural set of the combination of the 10×8 optical matrix switch and the two branching elements carry out switching of a plurality of four fiber rings.

3. A four fiber ring network optical switching circuit to be used at nodes for connecting optical fiber transmission paths in a ring shape so as to form a bidirectional optical ring network, the four fiber ring network optical switching circuit comprising:

first and second working and protection input and output ports and first and second working and protection add/drop input and output ports adapted to input and output working and protection signals to be transmitted through the bidirectional optical ring network;

first and second branching elements adapted to branch each one of optical input signals for the first and second working add/drop input ports, and having first and second working add/drop branch-1 and branch-2 input ports for outputting branched optical signals; and a 10×8 optical matrix switch adapted to cross-connect a plurality of input ports including the first and second working and protection input ports, the first and second protection add/drop input ports and the first and second working add/drop branch-1 and branch-2 input ports, and a plurality of output ports including the first and second working and protection output ports and the first and second working protection add/drop output ports, and having eighty turnable mirrors provided at intersections of the input ports and the output ports, so as to realize a span switching function and a ring switching function.

4. The four fiber ring network optical switching circuit of claim 3, wherein the plurality of input ports includes at least ten input ports, and the plurality of output ports includes eight output ports.

5. The four fiber ring network optical switching circuit of claim 4, wherein a combination of the 10×8 optical matrix switch and the two branching elements is provided in plural sets, such that the plural sets of the combination of the 10×8 optical matrix switch and the two branching elements carrying out switching of a plurality of four fiber rings.

6. The four fiber ring network optical switching circuit of claim 3, further comprising:

third and fourth branching elements adapted to branch each one of optical input signals for the first and second protection add/drop input ports, and having first and second protection add/drop branch-1 and branch-2 input ports for outputting branched optical signals;

wherein the optical matrix switch is a 12×8 optical matrix switch in which working ports and protection ports are formed symmetrically such that functions of a working ring and a protection ring are reversible.

7. The four fiber ring network optical switching circuit of claim 3, wherein the optical matrix switch is a 10m×8m optical matrix switch, where m is an integer, such that the 10m×8m optical matrix switch carries out switching of m sets of four fiber rings, by being connected over rings including individual working and protection rings of m sets of the four fiber rings.

* * * * *